United States Patent [19]

Nagatomi

[11] Patent Number: 4,794,458
[45] Date of Patent: Dec. 27, 1988

[54] MODULATION DEVICE
[75] Inventor: Akihiko Nagatomi, Kobe, Japan
[73] Assignee: DX Antenna Company, Ltd., Hamazaki, Japan
[21] Appl. No.: 85,189
[22] Filed: Aug. 14, 1987
[30] Foreign Application Priority Data Aug. 25, 1986 [JP] Japan .................. 61-199341

[51] Int. Cl.$^4$ .................. H04N 5/38; H04N 5/40
[52] U.S. Cl. .................. 358/186; 358/23; 358/189; 455/197
[58] Field of Search .................. 358/73, 142, 143, 186, 358/189, 195.1, 188; 455/197, 340, 125, 266

[56] References Cited

U.S. PATENT DOCUMENTS

| | | | |
|---|---|---|---|
| 4,063,179 | 12/1977 | Brown | 455/197 |
| 4,249,261 | 2/1981 | Ogita | 455/266 |
| 4,262,361 | 4/1981 | Hauer | 455/266 |
| 4,480,338 | 10/1984 | Dobrovolny | 455/197 |
| 4,607,215 | 8/1986 | Takano et al. | 455/197 |
| 4,726,072 | 2/1988 | Yamashita et al. | 455/197 |
| 4,727,336 | 2/1988 | Mark | 358/184 |
| 4,731,877 | 3/1988 | Moon | 455/340 |

OTHER PUBLICATIONS

Honda et al., "Future Promotion of the Cable TV System Applications", 20th Annual NCTA Convention Official Transcript, P. 542–561, Jul. 6–9, 1971.

Primary Examiner—James J. Groody
Assistant Examiner—John K. Peng
Attorney, Agent, or Firm—Morris Fidelman; Franklin D. Wolffe

[57] ABSTRACT

A modulation device especially suitable for use in a joint TV reception device for tuning the input video and audio signals to various TV channel frequencies. The device includes a modulator for modulating a carrier wave with the video and audio signals to provide a modulated signal, a mixer for mixing the modulated signal with a local oscillation signal to provide mixed signals, a wide band amplifier for amplifying the mixed signals and a variable low-pass filter for filtering the amplified mixed signals to provide a TV broadcasting signal of desired frequency. The device further includes a control device for controlling the frequency of the local oscillation signal and the cutoff frequency of the variable low-pass filter so as to cancel a higher harmonic component from the output signal to avoid undesirable inteference.

2 Claims, 1 Drawing Sheet

MODULATION DEVICE

BACKGROUND OF INVENTION

This invention relates to a modulation device used for modulating with video and audio signals and, more particularly, to a modulation device suitable for use at the head end of a joint reception device.

As disclosed, for example, by Hitoshi Honda et al in "Future Promotion of the Cable TV System Applications", in pages 542 to 561 of The Official Transcript for 20th Annual NCTA Convention, July 6-9, 1971, at the head end of a joint TV reception device, it is a general practice to modulate a carrier wave with baseband video and audio signals obtained by demodulating a received satellite broadcasting signal which has been actively developed recently to obtain a TV broadcasting signal which is transmitted further. To this end, a plurality of modulation devices as shown in FIG. 3 (based upon FIG. 5 of the reference) are installed and provided respectively with baseband video and audio signals indicative of mutually different information contents, thereby forwarding respective outputs as TV broadcasting signals of different channels. Each of these modulation devices includes a modulator 2, a first mixer 4, a fixed oscillator 6, a band-pass filter (BPF) 8, a second mixer 10, a variable oscillator 12, a low-pass filter (LPF) 14 and a wide band, high power amplifier 16; and only the oscillation frequency of variable oscillator 12 is made different from those of the other modulation devices.

More particularly, the modulator 2 modulates a carrier wave of 45.75 MHz for example with the video signal and another carrier wave of 41.25 MHZ for example with the audio signal and supplies the resultant modulated signal $f_0$ to the first mixer 4. The first mixer 4 mixes the modulated signal $f_0$ with an oscillation signal $f_1$ (e.g., 567 MHz) from the fixed oscillator 6 and supplies mixed output signals $f_0+f_1$ and $f_0-f_1$ to the band-pass filter 8. The band-pass filter 8 extracts one of these mixed signals, for example, $f_0+f_1$ and supplied it to the second mixer 10. The second mixer 10 mixes the mixed signal $f_0+f_1$ with an oscillation signal $f_i$ ($i=1, 2, \ldots n$) and supplies the mixed output signals $F_i+(f_0+f_1)$ and $F_i-(f_0+f_i)$ to the low-pass filter 14. The frequency $F_i$ is previously selected so that one of these mixed output signals have a frequency needed in the corresponding TV channel of each modulation device. The low-pass filter 14 passes the necessary frequency signal, $F_i-(f_0+f_1)$ for example, and supplies it to the wide band, high power amplifier 16. The amplifier 16 amplifies the signal $F_i-(f_0+f_1)$ for further transmission.

Such modulation device is advantageous in that it is possible to obtain a TV broadcasting signal of any channel by merely adjusting the oscillation frequency of the variable oscillator 12. For this purpose, the cutoff frequency of the low-pass filter 14 is selected, for example, as 300 MHz so that the filter 14 can pass the TV broadcasting signal which is highest in frequency of those provided by respective modulation devices. The wide band, high power amplifier 16 is also arranged to have a rather wide band width, for example, as 50 MHz to 300 MHz. so that it can amplify all TV broadcasting signals provided by the first to n-th modulation devices of the lowest to highest frequencies.

However, the output signal of the wide band, high power amplifier 16 may include a higher harmonic component and, if such component is delivered as it is, it may interfere the other equipments in which the higher harmonic frequency is used. For example, when the output frequency band of a specific modulation device is the channel 2 of U.S.A. where the carrier frequency of modulated video signal is 55.25 MHz, the carrier frequency of modulated audio signal is 59.75 MHz and their second higher harmonic frequencies are therefore 110.5 MHZ and 119.5 MHz, respectively, these harmonic frequencies will interfere the channel A-2 and A-1 within the 84-174 MHz band allotted to the U.S. CATV line. Although the frequency $f_1$ of the fixed oscillator 6 of the above-mentioned modulation device is selected as high as 567MHz, if it is low, unnecessary one of the two mixed outputs of the second mixer 10 may pass the low-pass filter 14 to be amplified by the amplifier 16 for delivery and the danger of interference is still maintained.

SUMMARY OF INVENTION

Accordingly, an object of this invention is to provide an improved modulation device which can shut off the above-mentioned higher harmonic component of the difference signal which may be generated from the wide band, high power amplifier, as well as the sum signal of the modulated signal and the oscillation signal.

This object can be attained in accordance with this invention which provides a modulation device comprising a modulator for producing a modulated signal which is modulated with video and audio signals, a variable oscillator for producing an oscillation signal having a variable oscillation frequency, a mixer for mixing said mofulated signal and said oscillation signal, a wide band amplifier for amplifying the output of said mixer, a variable low-pass filter having a variable cutoff frequency for filtering the output of said wide band amplifier, and control means for producing a frequency control signal for controlling the frequency of said oscillation signal and a cutoff frequency control signal for controlling said cutoff frequency. The frequency control signal is selected so that the output of the first mixer which is the difference between the modulated signal and the oscillation signal has a predetermined frequency and the cutoff frequency control signal is selected to set the cutoff frequency of the low-pass filter so that the filter can shut off any signal having a frequency higher than the predetermined frequency.

These and other objects and features of this invention will be described in more detail below with reference to the accompanying drawings.

BRIEF DESCRIPTION OF DRAWINGS

In the drawings.

Throughout the drawings, the same reference numerals are given to corresponding structural components.

DESCRIPTION OF PREFERRED EMBODIMENT

Figure 1:
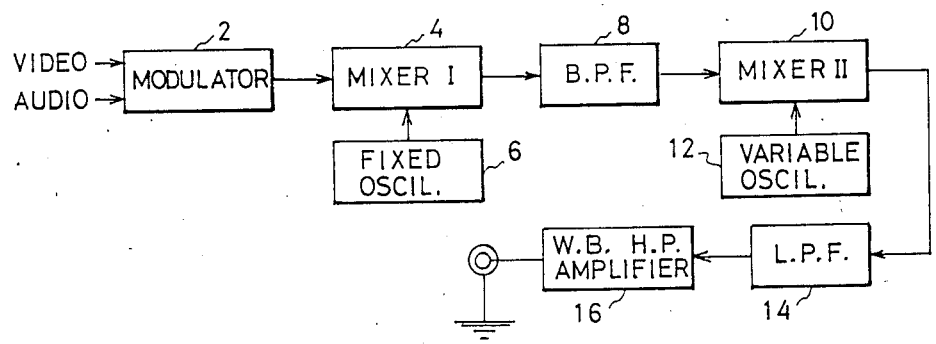
FIG. 1 is a block diagram representing a part of the head end of a joint reception device in which a prior art modulation device is used.
Figure 2:
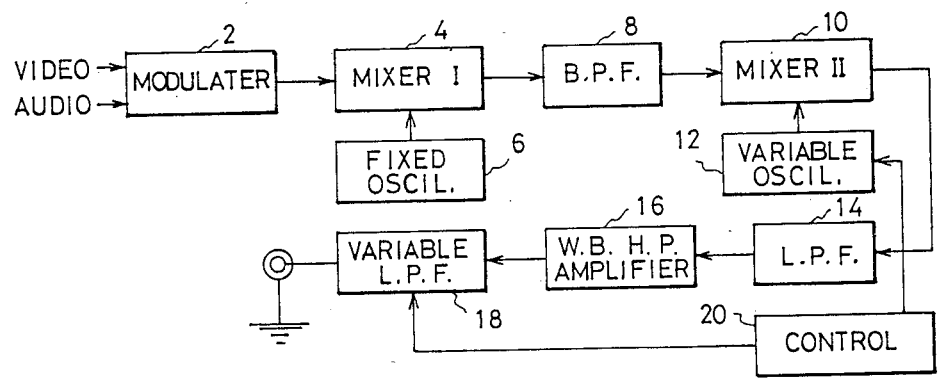
FIG. 2 is a block diagram representing an embodiment of the modulation device according to this invention.

As shown in FIG. 2, the modulation device of this invention is similar in configuration to the prior art modulation device described above with reference to FIG. 1, except that a variable low-pass filter 18 is coupled to the output of the wide band, high power amplifier 16 and a control unit 20 is provided for controlling the cutoff frequency of the filter 18 and the oscillation frequency of the variable oscillator 12.

Figure 3:
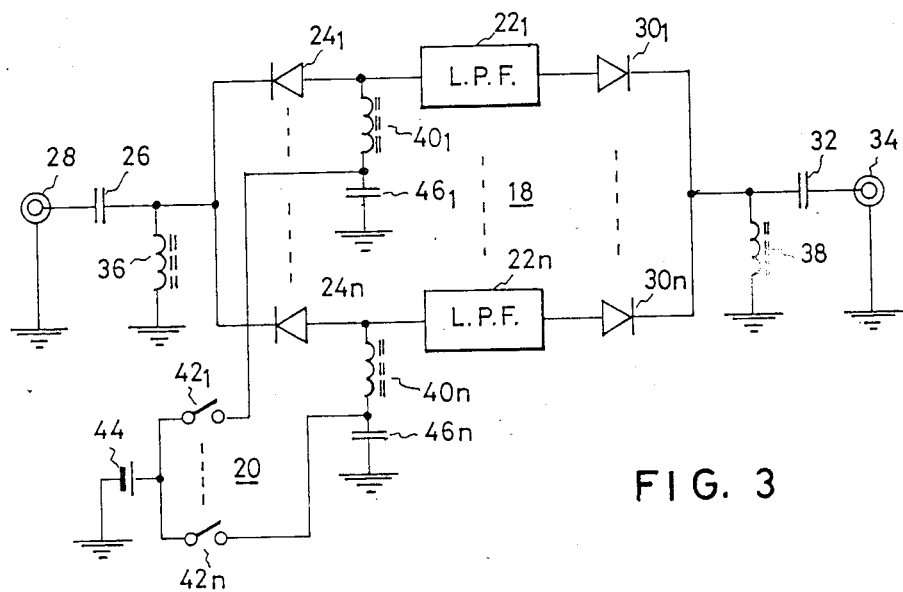
FIG. 3 is a schematic circuit diagram of a variable low-pass filter used in the embodiment of FIG. 2.

As shown in FIG. 3, the variable low-pass filter 18 includes a plurality (n-number) of low-pass filters $22_1$, . . . $22_n$ having mutually different cutoff frequencies, such as those well-known in the art as composed of passive elements such as capacitors and reactors, respectively. The input of these low-pass filters $22_1$, . . . $22_n$ are connected to the anode electrodes of respective diodes $24_1$, . . . $24_n$ whose cathode electrodes are coupled together through a d.c. blocking capacitor 26 to an input terminal 28 which is connected to the output terminal of the wide band, high power amplifier 16. The outputs of the low-pass filters $22_1$, . . . $22_n$ are also connected to the anode electrodes of respective diodes $30_1$, . . . $30_n$ whose cathode electrodes are coupled through a capacitor 32 to an output terminal 34. The cathode electrodes of diodes $24_1$, . . . $24_n$ are grounded through a common high frequency blocking coil 36 and the cathode electrodes of diodes $30_1$, . . . $30_n$ are also grounded through a common high frequency blocking coil 38.

The anode electrodes of diodes $24_1$, . . . $24_n$ are grounded through respective series connections of high frequency blocking coils $40_1$, . . . $40_n$ and by-pass capacitors $46_1$, . . . $46_n$ and the junctions of these coils and capacitors are connected through respective normally-open switches $42_1$, . . . $42_n$ included in the control unit 20 to a d.c. source 44. The control unit 20 further includes a known frequency control device (not shown) for controlling the oscillation frequency of the variable oscillator 12.

Next, the operation of this modulation device will be described below. Assume now a case wherein the video and audio signals supplied to the modulator 3 are to be converted into a TV broadcasting signal of a specific channel of frequency $f_3$. In this case, the oscillation frequency of the fixed oscillator 6 is fixed to $f_1$ and the band-pass filter 8 delivers the sum of this $f_1$ and the modulated signal $f_0$ from the modulator 2. Therefore, it is possible to calculate the oscillation frequency $f_2$ of the variable oscillator 12 required for deriving $f_3$. Then, the frequency control device in the control unit 20 is adjusted to oscillate the variable oscillator 12 at the frequency $f_2$. One of the low-pass filters $22_1$, . . . $22_n$ in the variable low-pass filter 18 which shuts off frequencies higher than $f_3$, the filter $22_1$ for example, is selected and the normally-open switch $42_1$ corresponding to the low-pass filter $22_1$ in the control unit 20 is closed. This results in a d.c. current flowing through d.c. source 44, closed normally-open switch $42_1$, high frequency blocking coil $40_1$, diode $24_1$ and high frequency blocking coil 36 and another current flowing through d.c. source 44, closed normally-open switch $42_1$, high frequency blocking coil $40_1$, low-pass filter $22_1$, diode $30_1$ and high frequency blocking coil 38. Thus, the diodes $24_1$ and $30_1$ conduct and the input and output of the low-pass filter $22_1$ are coupled through capacitors 26 and 32 to the input and output terminals 28 and 34, respectively.

With the above-mentioned arrangement of FIG. 2, the wide band, high power amplifier 16 produces an output of frequency $f_3$ which is equal to $f_0+f_1-f_2$ in the same fashion as shown in FIG. 1. In this case, however, no higher frequency component of $f_3$ such as $2f_3$ is produced from the output terminal 34 even if the output signal of wide band, high power amplifier 16 includes such high frequency component, since the output of wide band, high power amplifier 16 is supplied to the low-pass filter $22_1$ in the variable low-pass filter 18, which has a cutoff frequency for shutting off any frequency higher than $f_3$. Moreover, even when the fixed oscillation frequency $f_1$ of fixed oscillator 6 is lowered and the second mixed signal frequency $f_3'(=f_0+f_1+f_2)$ other than the first frequency $f_3(=f_0+f_1-f_2)$ become lower than the cutoff frequency of the low-pass filter 14, it will be shut off by the variable low-pass filter 18 since $f_3'$ is higher that $f_3$.

As described above, the modulation device of this invention can tune the reception device to any channel frequency by merely adjusting the control unit 20 so that the variable oscillation frequency is adapable to the channel frequency and any frequency higher than the channel frequency is shut off, and there is no need of exchange of parts or components.

It should be noted that the above description has been made only for illustrative purpose and many variations, modifications and changes can be made by those skilled in the art within the scope of this invention as defined in the appended claims. For example, the first mixer 4 and fixed oscillator 6 may be removed to subject the modulated signal $f_0$ to a single process of frequency modulation, though double frequency modulation is applied to the modulated signal $f_0$ in the above embodiment using the first and second mixers 4 and 10 and the fixed and variable oscillators 6 and 12.

I claim:

1. A modulation device comprising modulator means for modulating a carrier wave with input video and audio signals to provide a modulated signal, variable oscillator means for providing an oscillation signal having variable frequency, mixer means for mixing said modulated signal with said oscillation signal to provide mixed signals, wide band amplifier means for amplifying said mixed signals to provide amplified mixed signals, variable low-pass filter means having a variable cutoff frequency for filtering said amplified mixed signals to provide an output signal having a predetermined frequency, and control means for providing a frequency control signal for controlling the frequency of said oscillation signal and a cutoff frequency control signal for controlling said cutoff frequency, characterized in that said frequency control signal is selected to specify said predetermined frequency as the output frequency of said mixer means which is the frequency difference between said modulated signal and said oscillation signal and said cutoff frequency control signal is selected to provide said variable low-pass filter means with a cutoff frequency for causing said filter to shut off any frequency higher than said predetermined frequency.

2. A modulation device according to claim 1, characterized in that said variable low-pass filter means includes a plurality of low-pass filters having mutually different cutoff frequencies and being coupled in parallel between the input and output terminals of said variable low-pass filter means and said control means includes switching means for selectively applying an operating power to said filters.

* * * * *

UNITED STATES PATENT AND TRADEMARK OFFICE
CERTIFICATE OF CORRECTION

PATENT NO. : 4,794,458
DATED : December 27, 1988
INVENTOR(S) : Akihiko Nagatomi

It is certified that error appears in the above-identified patent and that said Letters Patent is hereby corrected as shown below:

On the Title Page, Item [73], Assignee:, should read
-- DX Antenna Company, Ltd.,
Kobe, Japan --.

Signed and Sealed this

Thirteenth Day of June, 1989

Attest:

DONALD J. QUIGG

Attesting Officer

Commissioner of Patents and Trademarks